(12) United States Patent
Azevedo et al.

(10) Patent No.: US 11,048,877 B2
(45) Date of Patent: Jun. 29, 2021

(54) SYSTEM AND METHOD FOR GENERATING ONTOLOGIES USING NATURAL LANGUAGE UTTERANCES

(71) Applicant: INTERNATIONAL BUSINESS MACHINES CORPORATION, Armonk, NY (US)

(72) Inventors: Leonardo Guerreiro Azevedo, Rio de Janeiro (BR); Joel Luis Carbonera, Rio de Janeiro (BR); Viviane Torres Da Silva, Rio de Janeiro (BR); Maira Gatti De Bayser, Rio de Janeiro (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 194 days.

(21) Appl. No.: 16/293,860

(22) Filed: Mar. 6, 2019

(65) Prior Publication Data

US 2020/0285698 A1    Sep. 10, 2020

(51) Int. Cl.
| | | |
|---|---|---|
| G10L 15/22 | (2006.01) | |
| G06F 40/237 | (2020.01) | |
| G06F 40/279 | (2020.01) | |
| G06F 40/295 | (2020.01) | |
| H04L 12/58 | (2006.01) | |
| G10L 15/18 | (2013.01) | |
| G10L 15/26 | (2006.01) | |

(52) U.S. Cl.
CPC .......... *G06F 40/295* (2020.01); *G10L 15/18* (2013.01); *G10L 15/26* (2013.01); *H04L 51/02* (2013.01)

(58) Field of Classification Search
CPC ........ G06F 16/36; G06F 16/367; G06F 40/20; G06F 40/205; G06F 40/237; G06F 40/279; G10L 15/18; G10L 15/22
USPC ....... 704/1, 9, 10, 257, 270, 270.1; 707/736, 707/741
See application file for complete search history.

(56) References Cited

U.S. PATENT DOCUMENTS

| | | | | |
|---|---|---|---|---|
| 8,566,347 | B1 * | 10/2013 | Patil ...................... | G06F 16/951 |
| | | | | 707/769 |
| 9,336,306 | B2 | 5/2016 | McAteer et al. | |
| 9,489,625 | B2 * | 11/2016 | Kalns ....................... | G06N 5/02 |
| 2004/0054672 | A1 * | 3/2004 | Tsuchitani ............ | G06F 16/951 |
| 2007/0078815 | A1 * | 4/2007 | Weng ..................... | G06F 16/243 |

(Continued)

OTHER PUBLICATIONS

Inna Novalija, et al., "Applying NLP for Building Domain Ontolgy: Fashion Collection," pp. 1-4, 2013.

(Continued)

*Primary Examiner* — Martin Lerner
(74) *Attorney, Agent, or Firm* — F. Chau & Associates, LLC

(57) ABSTRACT

A computer-implemented method for constructing an ontology includes using a chatbot program to elicit an utterance from a user. An utterance is received from the user. The received utterance is parsed to detect a concept/property/relationship therein. It is determined whether the identified concept/property/relationship is represented within an ontology and the identified concept/property/relationship is added to the ontology when it is determined that the it is not present therein. A response to the received utterance is generated using the ontology. The generated response is presented to the user using the chatbot.

20 Claims, 6 Drawing Sheets

(56) References Cited

U.S. PATENT DOCUMENTS

| | | | |
|---|---|---|---|
| 2008/0281915 A1* | 11/2008 | Elad | G06Q 30/02 709/204 |
| 2008/0301083 A1* | 12/2008 | Zhang | G06F 40/30 706/61 |
| 2012/0005655 A1* | 1/2012 | Roy | G06F 8/75 717/123 |
| 2014/0114953 A1* | 4/2014 | McClung | G06F 16/26 707/722 |
| 2014/0317127 A1 | 10/2014 | Lee et al. | |
| 2016/0147875 A1* | 5/2016 | Adderly | G06F 16/367 707/726 |
| 2016/0239745 A1* | 8/2016 | Bagchi | G06N 5/04 |
| 2017/0004208 A1 | 1/2017 | Podder et al. | |
| 2018/0189284 A1* | 7/2018 | Hosabettu | G06F 16/367 |
| 2018/0307678 A1* | 10/2018 | Anantaram | G06N 3/08 |
| 2019/0026365 A1* | 1/2019 | Karuppasamy | G06F 40/20 |
| 2019/0121801 A1* | 4/2019 | Jethwa | G06F 16/3334 |
| 2019/0171712 A1* | 6/2019 | Eisenzopf | G06F 40/30 |
| 2019/0182382 A1* | 6/2019 | Mazza | G10L 15/1815 |
| 2019/0361671 A1* | 11/2019 | Maltsev | G10L 15/22 |

OTHER PUBLICATIONS

Emhimed Salem Alatrish, et al.,"Building Ontologies for Different Natural Languages," Computer Science and Information Systems 11(2); pp. 623-644, Apr. 29, 2013.

Bastian Haarmann, et al., "How to Make Ontologies Self-Building From Wiki-Texts," pp. 1-5.

Authors, et al., "Technique for Instrumenting Natural Language Support Into an RDF/Owl Model," ip.com Electronics Publication Date: Feb. 6, 2013, pp. 1-4.

Authors, et al., "Contextual Inference in Underspecified Queries Using Ontology-Driven NLP," ip.com Electronics Publication Date: May 7, 2013, pp. 1-2.

* cited by examiner

SYSTEM AND METHOD FOR GENERATING ONTOLOGIES USING NATURAL LANGUAGE UTTERANCES

BACKGROUND

The present invention relates to ontologies and, more specifically, to systems and methods for generating ontologies using natural language.

In the fields of computer and information sciences, an ontology is a set of data descriptive of things and concepts and a relational hierarchy linking the things and concepts of the set to each other. Ontologies are useful in defining a common vocabulary and a shared understanding to enable person-to-computer communication. Through the use of ontologies, natural language may be transformed into machine-readable and machine-understandable content in a manner that is context-aware so as to be able to correctly interpret language whose meaning may be highly dependent upon context.

Because of the high utility associated with ontologies, ontology generation is of particular importance. Traditionally, a skilled engineer working on cooperation with a domain expert with access to relevant data will construct an ontology by defining terms and establishing a categorical relationship between the various terms. For example, an automotive ontology may define a term "vehicle" which may have a definition as well as constituent terms such as "cars" "trucks" "minivans" and "SUVs." Each of these terms may be defined and may themselves have constituent terms. For example, "cars" may include the terms "coupe," "sedan," and "convertible." This ontology may then be used in natural-language processing to interpret the meaning of "convertible" correctly in the context of automotives rather than in some other context such as finance where the same term may have a different meaning.

As natural-language processing and other fields of computer science requiring the construction of ontologies grow in popularity, more convenient approaches to ontology generation may be desired.

SUMMARY

A computer-implemented method for constructing an ontology includes using a chatbot program to elicit an utterance from a user. An utterance is received from the user. The received utterance is parsed to detect a concept therein. It is determined whether the identified concept is represented within an ontology and the identified concept is added to the ontology when it is determined that the concept is not present therein. The received utterance is parsed to detect a property therein. It is determined whether the identified property is represented within the ontology and the property is added to the ontology when it is determined that the property is not present therein. The received utterance is parsed to detect a relationship therein. It is determined whether the identified relationship is represented within the ontology and the relationship is added to the ontology when it is determined that the relationship is not present therein. A response to the received utterance is generated using the ontology. The generated response is presented to the user using the chatbot.

A system for constructing an ontology includes a smart speaker and/or a voice-based digital assistant configured to elicit and receive a vocal utterance from a user by producing audible words transmitted from a chatbot running on a first remote computer server over a computer network, configured to receive the vocal utterance. The chatbot is configured to parse the received utterance to detect a concept therein. An ontology generator is configured to determine whether the identified concept is represented within an ontology and adding the identified concept to the ontology when it is determined that the concept is not present therein. The chatbot is further configured to parse the received utterance to detect a property therein. The ontology generator is further configured to determine whether the identified property is represented within the ontology and adding the property to the ontology when it is determined that the property is not present therein. The chatbot is further configured to parse the received utterance to detect a relationship therein. The ontology generator is further configured to determine whether the identified relationship is represented within the ontology and adding the relationship to the ontology when it is determined that the relationship is not present therein. The chatbot is further configured to generate a response to the received utterance using the ontology. The smart speaker and/or a voice-based digital assistant is further configured to present the generated response to the user using the chatbot.

A computer program product for constructing an ontology includes a computer readable storage medium having program instructions embodied therewith, the program instructions executable by a computer to cause the computer to use a chatbot program to elicit an utterance from a user. An utterance is received from the user. The received utterance is parsed to detect a concept therein. It is determined whether the identified concept is represented within an ontology and the identified concept is added to the ontology when it is determined that the concept is not present therein. The received utterance is parsed to detect a property therein. It is determined whether the identified property is represented within the ontology and the property is added to the ontology when it is determined that the property is not present therein. The received utterance is parsed to detect a relationship therein. It is determined whether the identified relationship is represented within the ontology and the relationship is added to the ontology when it is determined that the relationship is not present therein. A response to the received utterance is generated using the ontology. The generated response is presented to the user using the chatbot.

BRIEF DESCRIPTION OF THE SEVERAL VIEWS OF THE DRAWINGS

A more complete appreciation of the present invention and many of the attendant aspects thereof will be readily obtained as the same becomes better understood by reference to the following detailed description when considered in connection with the accompanying drawings, wherein.

DETAILED DESCRIPTION

Figure 1:
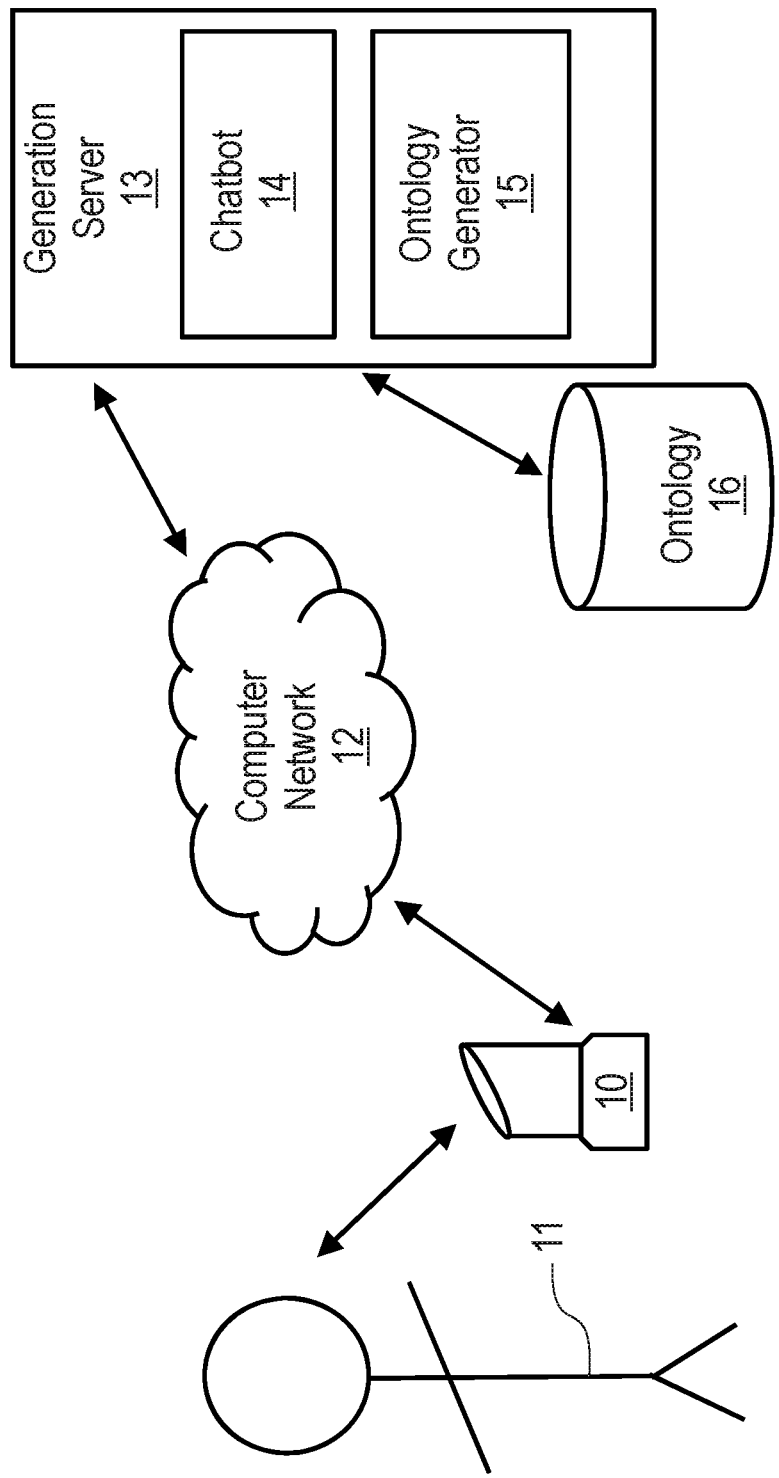
FIG. 1 is a schematic diagram illustrating a system for generating ontologies in accordance with exemplary embodiments of the present invention.

In describing exemplary embodiments of the present invention illustrated in the drawings, specific terminology is employed for sake of clarity. However, the present invention is not intended to be limited to the illustrations or any specific terminology, and it is to be understood that each element includes all equivalents.

Exemplary embodiments of the present invention provide systems and methods for generating ontologies using a chatbot interface. A chatbot is a computer program or artificial intelligence that conducts a conversation with a person, or perhaps another chatbot, in a natural-language context such as by text or voice. Exemplary embodiments of the present invention may utilize a chatbot to converse with at least one person, such as a subject matter expert, so as to extract information from that person and to use the extracted information to generate an ontology.

FIG. 1 is a schematic diagram illustrating a system for generating ontologies in accordance with exemplary embodiments of the present invention. A user 11, such as a subject matter expert, may communicate with a natural language interface device 10. The natural language interface device 10 may be a device capable of accepting text input, such as a smartphone, a personal computer, or some other device capable of accepting and displaying textual information. Alternatively, or additionally, the natural language interface device 10 may be a device capable of accepting voice input such as a smart speaker. Where the natural language interface device 10 accepts and displays textual input, the user 11 may communicate with the natural language interface device 10 by typing thereon. Where the natural language interface device 10 accepts and produces spoken language, the user 11 may communicate with the natural language interface device 10 by speaking thereto.

The natural language interface device 10 may transmit the user's communication to a generation server 13, for example, over a computer network 12 such as the Internet. In this regard, the natural language interface device 10 may be disposed at a first location in which the user 11 is located and may then send received communications to the generation server 13 which is disposed at a second location.

The generation server 13 may be a computer system that the natural language interface device 10 is configured to interoperate with. Alternatively, the generation server 13 may be disposed within the natural language interface device 10. The generation server 13 may be configured to generate an ontology 16 by embodying various software modules. One such software module may be a chatbot 14. The chatbot is a module of programming, such as an application or function, that is programmed to communicate with the user 11 using natural language. The chatbot 14 may be programmed to receive communications from the user 11 via the natural language interface device 10 and extract relevant data therefrom. Another software module within the generation server 13 may be an ontology generator 15. The ontology generator 15 may be a module of programming, such as an application or function, that is programmed to construct an ontology 16 based on the relevant data extracted from the chatbot 14. Thus, the chatbot 14 is programmed to press the user 11 for relevant information pertaining to the various elements of the ontology and the interrelation of those elements.

Traditionally, generation servers generate ontologies by providing a complex user interface in which a technical user, such as an ontology engineer, is trained to navigate. Using this user interface, the technical user may construct the ontology by providing information in a highly systematic and structured manner. The technical user would work in conjunction with a subject matter user, who would be familiar with the subject matter of the ontology, to populate the fields of the user interface so as to generate the ontology.

However, the traditional approach is inefficient as it requires the use of a complex user interface that is difficult to populate. This stands in contrast to the approach of exemplary embodiments of the present invention in which no complex set of fields is required to be populated. Rather, according to exemplary embodiments of the present invention, the chatbot 14 is programmed to guide a natural language conversation with the user 11 so as to surface the information necessary for the ontology generator 15 to generate the ontology 16, and in this way, the operation of the generation server 13 is made more efficient.

Table 1 illustrates an example of dialogue in which a chatbot 14 send questions to the user 11 and creates and map the concepts, properties and relations into an ontology 16 illustrated in Table 2. Term as "is an" is mapped to a relation "isA", or "invested by an" is mapped to "investedBy". While entities such as "Investment", "personal", "VC" and "institutional" are mapped to "Investment", "Personal Investment", "VC investment", and "Institutional Investment" respectively, the "name" property is associated to the "company" concept.

TABLE 2

Example of ontology created from dialogue in Table 1.

Investment
    Properties: reported year, amount
    Functional: investedIn(Investee)
Institutional Investment
    Properties: type
    Inheritance: isA(Investment)
Personal Investment
    Inheritance: isA(Investment)
VC Investment
    Inheritance: isA(Investment)
Investee
    Membership: unionOf(Security). unionOf(Investee Company)
Security
    Functional: issuedBy(Investee Company)
Investee Company
    Properties: name
Investor Company
    Functional: investedBy(Investor Company)
Funding Round
    Functional: investedOn(Investee)
Transaction
    Properties: reported year, purchase year, type
    Functional: forCompany(Company)
Company
    Properties: name
Holding
    Properties: type
    Functional: forCompany(Company)
Borrower
    Inheritance: isA(Company)
Lender
    Inheritance: isA(Company)

TABLE 1

Example of Dialogue

Bot: Which concept you would like to first describe?
User : Investment
Bot: What do you know about investment?
User: I know three investment options: personal, VC and institutional.
Bot: So, for example, a personal investment is an Investment?
User: Yes.
Bot: What are the main differences between them?
User: The personal investment is/has . . .
User: The VC investment is /has . . .
User: The institutional investment is/has . . .
Bot: What else can you say about investment?
User: It is invested by an Investor Company.
Bot: What is an Investor Company?
User: An Investor Company is a Company.
Bot: Right, tell me more about an Investor Company.
User: It is related to a Funding Round.
Bot: What about Company? Does it have a name or other attributes?
User: Yes, a company has a name, and only that.
Bot: Can you list some companies?
User: IBM, . . .

Figure 2:
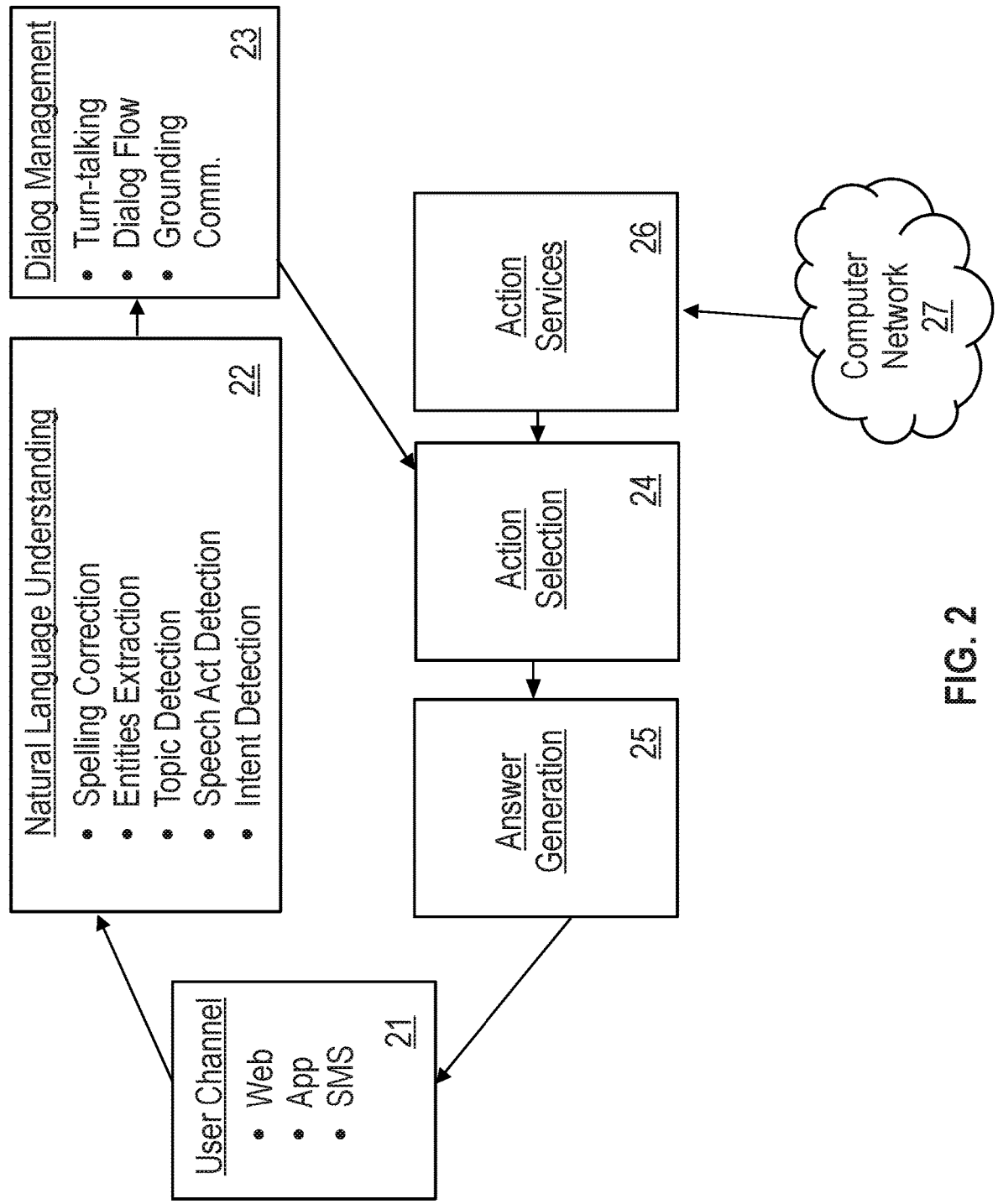
FIG. 2 is a chart illustrating a general architecture of a chatbot for guiding a natural language conversation with the user so as to surface the information necessary for the ontology generator to generate the ontology in accordance with exemplary embodiments of the present invention.

FIG. 2 is a chart illustrating a general architecture of a chatbot for guiding a natural language conversation with the user so as to surface the information necessary for the ontology generator to generate the ontology in accordance with exemplary embodiments of the present invention. The chatbot may be programmed with a user channel 21 that is programmed to interact with the user by a textual and/or vocal means such as over a web interface, via an app executing on a mobile device of a user, via text message (e.g. SMS), or via a smart speaker API.

The user channel 21 passes along the received user communications to a natural language understanding module 22, which places the communication into a more readily understandable form, such as by performing spelling correction, performing entity extraction, performing topic detection, performing speech act detection, performing intent detection, etc.

The natural language understanding module 22 may then provide the more readily understandable communication to a dialog management module 23. The dialog management module 23 may manage the course of the interaction between user and chatbot so as to provide conversationally relevant questions to solicit desired information from the user. The dialog management module 23 may manage conversational turn-taking, may manage dialog flow, may manage grounding communication, etc.

The dialog management module 23 may guide an action selection module 24 to select a question to ask based on the conversation flow and the required information. The action selection module 24 may also receive input from various other external sources of information, over a computer network 27 such as the Internet, which may be managed by an action services module 26. Examples of information that may be so retrieved and analyzed include documentation such as papers that experts have written pertaining to the subject matter, requirements documents, proposals and invitations to tender.

In this way, it is not necessary for all data needed to generate the ontology to come from the user. To the greatest extent possible, the ontology may be generated using information obtainable from the various external sources such as reference databases.

An answer generation module 25 may be responsible for forming replies to be sent back to the user to further the dialog and to solicit the information required to construct the ontology.

The ontologies so created may represent a knowledge representation about the world or some part of it. The ontologies may form a vocabulary, in the form of a knowledge representation, that describes the basic categories of being by defining entities, types of entities, and the relationships among them.

The ontologies may be instantiated as a data model that represents a domain, the objects of that domain, and the relationships between them. In this way, the ontologies may define a common vocabulary and a shared understanding.

The ontologies, once generated, may be used to annotate natural language so as to parse natural language communications into machine readable and machine understandable content. Machines may therefore use ontologies to understand natural language content so as to perform more meaningful and intelligent queries. For example, generated ontologies may be used to differentiate a natural language reference to a "jaguar" either as a reference to a car or an animal by understanding the contextual relationships between the words used. Ontologies may therefore be used to extract and combine information that is distributed on the web.

The generation server may be programmed to find classes and the relationship between the classes found. To accomplish this, the generation server may be programmed to identify candidates for classes which may include some nouns, gerunds, verbs, pronouns, etc.

The generation server may be programmed to determine relationships between the found classes, for example, by asking questions about possible relationships between various classes.

Figure 3:
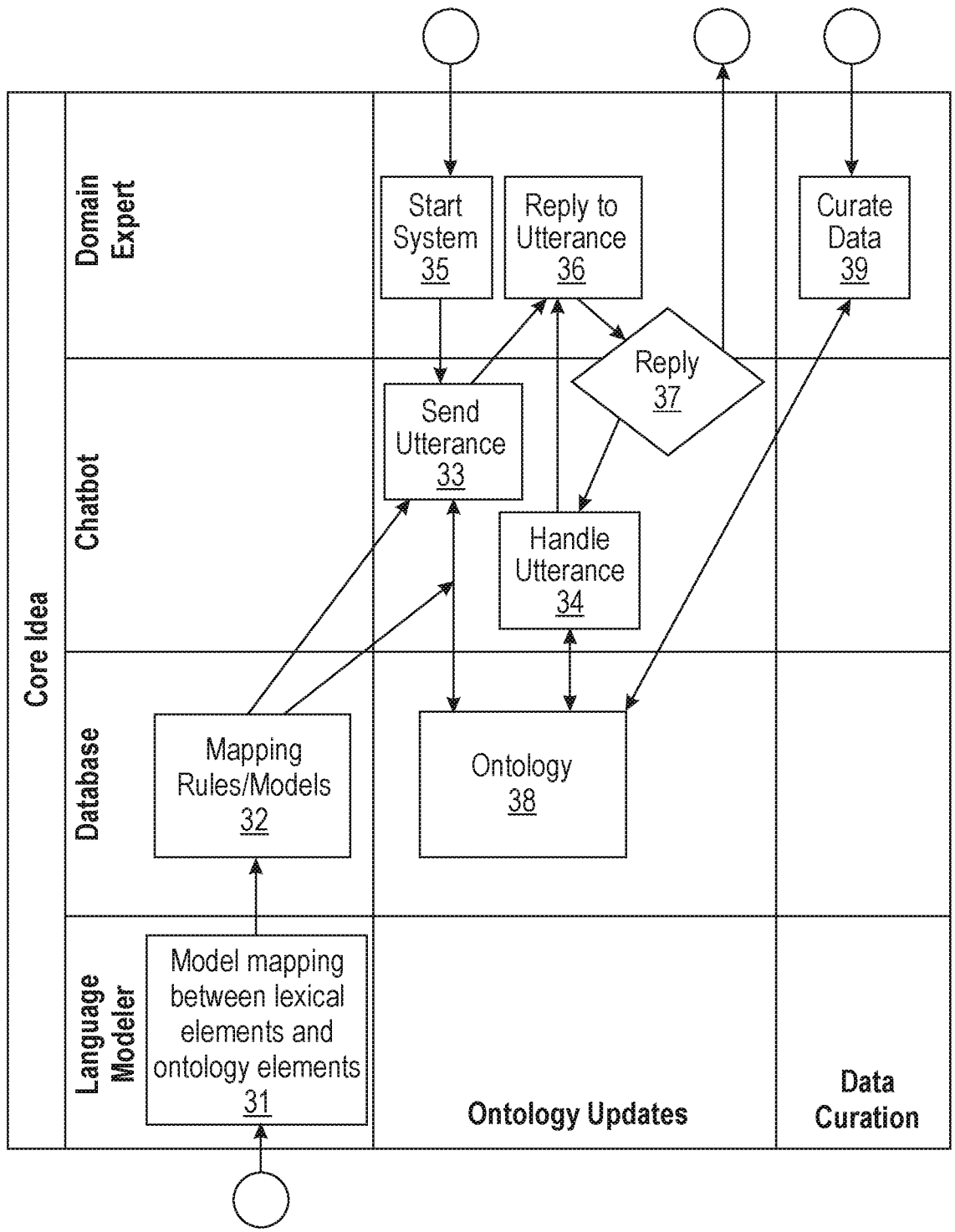
FIG. 3 is a flow chart illustrating an approach for generating an ontology in accordance with exemplary embodiments of the present invention.

FIG. 3 is a flow chart illustrating an approach for generating an ontology in accordance with exemplary embodiments of the present invention. According to this approach, a language modeler, a database, a chatbot and a domain expert may each operate to curate data and update ontologies.

The language modeler may model a mapping between lexical elements and ontology elements (31). The mapping may then be stored in a database for mapping rules and/or models (32). The chatbot may draw upon the information of the database (32) to send an utterance (33), for example, to ask a pointed question to advance understanding of the ontology. The utterance of the chatbot may reach the domain expert who may then issue a reply to the utterance (36). The utterance of the chatbot may not be sent (33) unless and until the domain expert has initiated the system (35).

The utterances of the domain expert may either be understood to be a reply to the utterance sent by the chatbot (Yes, 37) or as an unrelated utterance (No, 37). Where the utterance of the domain expert is understood to be a reply, the chatbot may proceed to handle the reply utterance (34). To this end, the chatbot may draw upon the mapping rules/modules (32) and what has already been incorporated into the ontology (38) and use this understanding to add to the ontology (38). However, the information provided to the ontology (38) may first be curated (39) by the domain expert.

Figure 4:
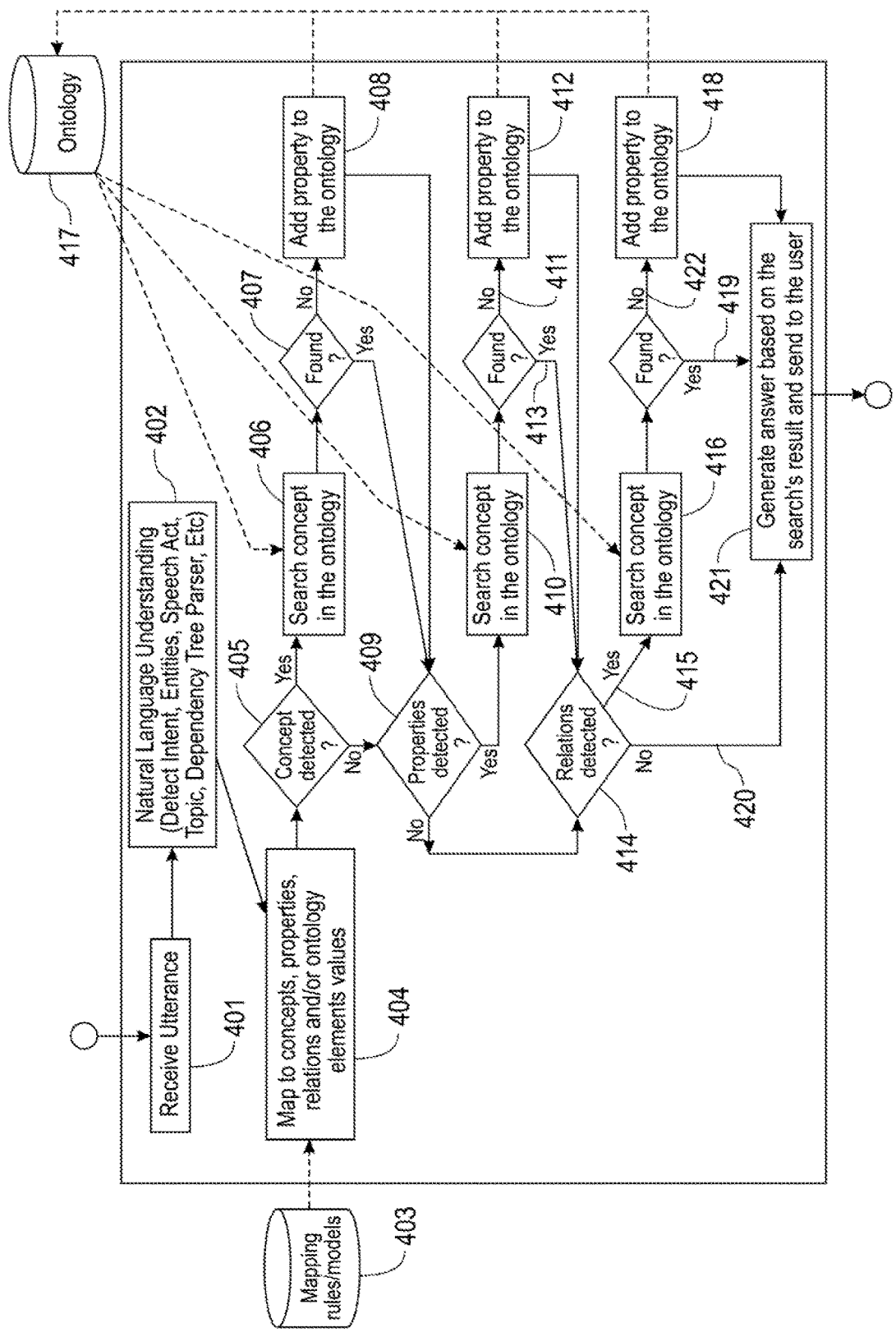
FIG. 4 is a flow chart illustrating greater detail on the updating of the ontology using the mapping rules/models and the utterances of the domain expert in accordance with exemplary embodiments of the present invention.

FIG. 4 is a flow chart illustrating greater detail on the updating of the ontology (38) using the mapping/rules/models (32) and the utterances of the domain expert (36). The received utterances (401) may be processed by natural language understanding to detect intent, entities, speech acts, topics, dependency tree parsing, etc. (402). This understanding and the mapped rules/modules (403) may be used to map concepts, properties and/or ontology element values (404). If the mapping results in a concept being detected (Yes, 405), then the concept may be searched for (406) using the ontology (417). If the concept is found within the ontology (417) (Yes, 407), or if the concept was not detected (No, 405), then properties may be detected (409). However, if the concept is not found within the ontology (417) (No, 407), then the concept may be added to the ontology (417) (408).

In detecting the properties from the mapping (409), properties may either be detected (Yes, 409), in which ease the property may be searched for from within the ontology (417) (410) or the properties are not detected (No, 409), in which case verification of detected relations is performed (414).

On searching for the property in the ontology (417) (410) either the property is found (Yes, 413) and the relations are detected (414), or the property is not found (No, 411) in which case the property is added to the ontology (417) (412).

In detecting the relations from the mapping (414), relations may be found (Yes, 415) in which case the relation is searched for within the ontology (417) (416). If the relation is not found therein (No, 422), then the relation is added to the ontology (417) (418). In this case or if the relation is found therein (Yes, 419) or if no relation was detected (420), then an answer is generated based on the search results and sent hack to the user (421).

In this way, the ontology may be constructed based on detected concepts, properties, and relations that are extracted from user utterances. The detected concepts, properties and relations that are not already present within the ontology may be added thereto and questions may be generated by the chatbot, for example, using a breadth-first-search (BFS) or depth-first-search (DFS) approach. Questions such as "Is it relevant to ask more about <something>" may be used to cheek if the search should continue on a particular direction or if it should backtrack. This approach may be referred to herein as "bottom-up building."

Alternatively, a "query-oriented building" approach may be used to construct the ontology in which the chatbot is configured to ask the queries that the user could send and follow up the dialog with questions regarding the concepts that are present in the queries.

The chatbot could also ask questions about constraints over concepts and properties, to ask questions about property domains and ranges that are not constraints, and to ask questions about restrictions. All of these questions could be sent through dialogue with natural language.

For instance, two classes in an ontology are disjoint if they cannot share an instance. Therefore the chatbot could generate questions for pairs of instances of given concepts or properties like: Can <concept/property> be both <instance A> and <instance B)? For example, Can a company be both lender and borrower?

In case of functional properties, a template like "Can a <concept/property> be <relation><concept/property> with cardinality 0, 1 or many?" For example, "Can a 'person' be 'son of' more than one 'person'?" would be a different way of saying "Can a 'person' be 'son of' 'person' with cardinality 0, 1 or many?" In this case, a set of synonyms can be generated for each template.

More examples of questions about constraints over concepts and properties may include:
  Transitive properties: e.g. Always that B is "ancestor of" C, and A is "ancestor of" B, A is also "ancestor of C"?
  Symmetric properties: e.g. Always that A is "sibling of" B, B is also "sibling of" A?
  Asymmetric properties: e.g. When A is "father of" B, B never is "father of" A?
  Irreflexive properties: e.g. Always that A is "father of" B, A is also "ancestor of" B?
  Questions about restrictions may include:
  Existential (it exists)
  Universal (for all)

Accordingly, exemplary embodiments of the present invention may utilize a chatbot to construct the ontology.

Figure 5:
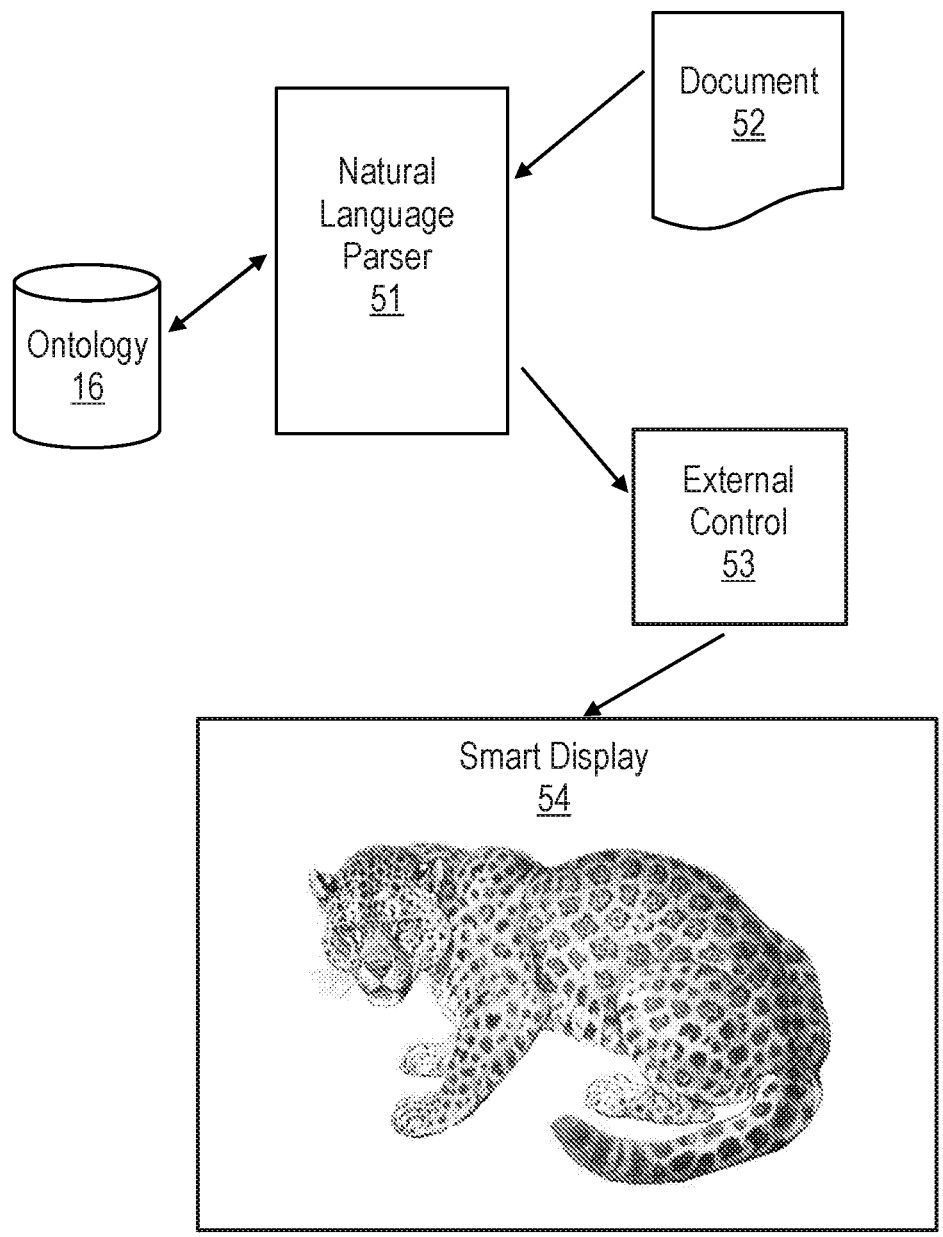
FIG. 5 is a schematic diagram illustrating an example of practical uses for an ontology so constructed in accordance with exemplary embodiments of the present invention.

FIG. 5 is a schematic diagram illustrating an example of practical uses for an ontology so constructed in accordance with exemplary embodiments of the present invention. Here, the ontology 16 may be used by a natural language parser 51, operating in conjunction with a smart speaker or some other natural language device, to receive a natural language document or utterance 52 and interpret the document or utterance 52 so as to produce an external command 53. The external command may perform any of a wide variety of features, such as to control the operation of a smart home device, such as a smart display 54 that operates in response to the command. For example, the document or utterance 52 may ask to display a jaguar and the natural language parser 51 may act with the understanding of the ontology 16, created in accordance with the approach described above, to understand the context of the document or utterance 52 and thereby display the jaguar intended by the user (be it animal or car) upon the smart display 54.

Figure 6:
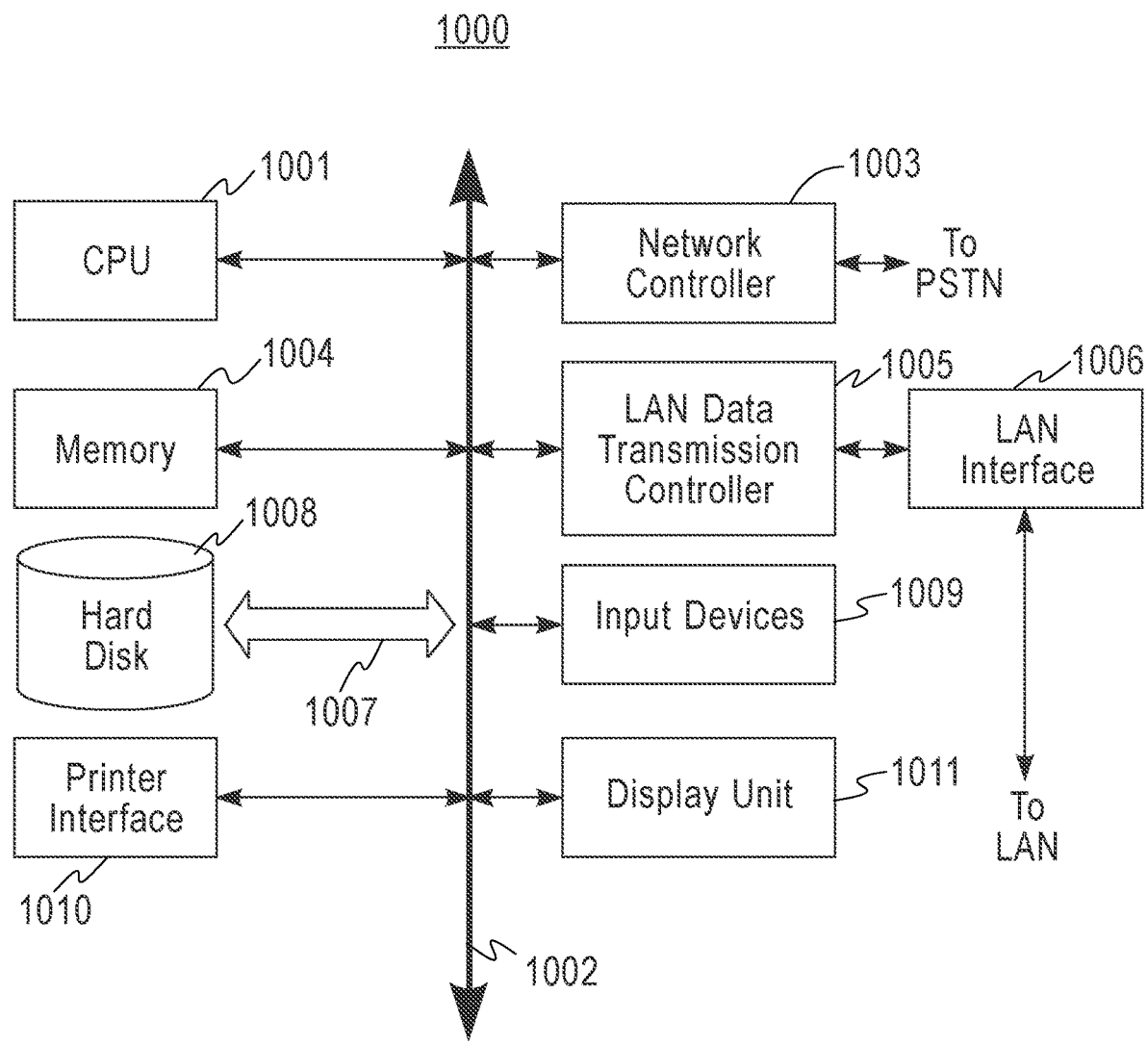
FIG. 6 shows an example of a computer system capable of implementing the method and apparatus according to embodiments of the present disclosure.

FIG. 6 shows another example of a system in accordance with some embodiments of the present invention. By way of overview, some embodiments of the present invention may be implemented in the form of a software application running on one or more (e.g., a "cloud" of) computer system(s), for example, mainframe(s), personal computer(s) (PC), handheld computer(s), client(s), server(s), peer-devices, etc. The software application may be implemented as computer readable/executable instructions stored on a computer readable storage media (discussed in more detail below) that is locally accessible by the computer system and/or remotely accessible via a hard wired or wireless connection to a network, for example, a local area network, or the Internet.

Referring now to FIG. 6, a computer system (referred to generally as system 1000) may include, for example, a processor e.g., central processing unit (CPU) 1001, memory 1004 such as a random access memory (RAM), a printer interface 1010, a display unit 1011, a local area network (LAN) data transmission controller 1005, which is operably coupled to a LAN interface 1006 which can be further coupled to a LAN, a network controller 1003 that may provide for communication with a Public Switched Tel Network (PSTN), one or more input devices 1009, for example, a keyboard, mouse etc., and a bus 1002 for operably connecting various subsystems/components. As shown, the system 1000 may also be connected via a link 1007 to a non-volatile data store, for example, hard disk, 1008.

In some embodiments, a software application is stored in memory 1004 that when executed by CPU 1001, causes the system to perform a computer-implemented method in accordance with some embodiments of the present invention, e.g., one or more features of the methods, described with reference to the aforementioned figures.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary embodiments described herein are illustrative, and many variations can be introduced without departing from the spirit of the invention or from the scope of the appended claims. For example, elements and/or features of different exemplary embodiments may be combined with each other and/or substituted for each other within the scope of this invention and appended claims.

What is claimed is:

1. A computer-implemented method for constructing an ontology, comprising:
eliciting an utterance from a user;
receiving the utterance from the user;

parsing the received utterance to detect a concept therein;
determine whether the identified concept is represented within an ontology and adding the identified concept to the ontology when it is determined that the concept is not present therein;
parsing the received utterance to detect a property therein;
determine whether the identified property is represented within the ontology and adding the property to the ontology when it is determined that the property is not present therein;
parsing the received utterance to detect a relationship therein;
determine whether the identified relationship is represented within the ontology and adding the relationship to the ontology when it is determined that the relationship is not present therein;
generating a response to the received utterance using the ontology; and
presenting the generated response to the user,
wherein adding the identified concept to the ontology includes asking the user one or more questions related to the concept,
wherein adding the identified property to the ontology includes asking the user one or more questions related to the property, and
wherein adding the identified relationship to the ontology includes asking the user one or more questions related to the relationship.

2. The computer-implemented method of claim 1, wherein the steps of eliciting an utterance from the user and presenting the generated response to the user are performed using a chatbot program.

3. The computer-implemented method of claim 2, wherein the chatbot program is instantiated as a text-based communication interface.

4. The computer-implemented method of claim 3, wherein the user interacts with the text-based communication interface via text messages from a mobile phone.

5. The computer-implemented method of claim 2, wherein the chatbot program is instantiated as a smart speaker and/or a voice-based digital assistant.

6. The computer-implemented method of claim 5, wherein the smart speaker and/or digital assistant is in communication with the chatbot program over a computer network.

7. The computer-implemented method of claim 1, wherein the received utterance is received in vocal form or a textual form and is then digitized.

8. The computer-implemented method of claim 1, wherein the generated response is presented to the user as synthetic speech.

9. The method of claim 1, wherein asking the user one or more questions related to the concept includes using a breadth-first-search (BFS) or depth-first-search (DFS) approach and bottom-up building.

10. The method of claim 1, wherein asking the user one or more questions related to the relationship includes questions about possible relationships between various classes.

11. A system for constructing an ontology, comprising:
a smart speaker and/or a voice-based digital assistant configured to elicit and receive a vocal utterance from a user by producing audible words transmitted from a chatbot running on a first remote computer server over a computer network, configured to receive the vocal utterance;
the chatbot configured to parse the received utterance to detect a concept therein;
an ontology generator configured to determine whether the identified concept is represented within an ontology and adding the identified concept to the ontology when it is determined that the concept is not present therein;
the chatbot further configured to parse the received utterance to detect a property therein;
the ontology generator further configured to determine whether the identified property is represented within the ontology and adding the property to the ontology when it is determined that the property is not present therein;
the chatbot further configured to parse the received utterance to detect a relationship therein;
the ontology generator further configured to determine whether the identified relationship is represented within the ontology and adding the relationship to the ontology when it is determined that the relationship is not present therein; the chatbot further configured to generate a response to the received utterance using the ontology; and
the smart speaker and/or a voice-based digital assistant further configured to present the generated response to the user using the chatbot,
wherein adding the identified concept to the ontology includes asking the user one or more questions related to the concept,
wherein adding the identified property to the ontology includes asking the user one or more questions related to the property, and
wherein adding the identified relationship to the ontology includes asking the user one or more questions related to the relationship.

12. The system of claim 11, wherein the ontology generator is instantiated on a second remote computer server in communication with the smart speaker and/or a voice-based digital assistant over the computer network.

13. The system of claim 11, wherein the ontology generator is instantiated as an application running on the smart speaker and/or a voice-based digital assistant.

14. The system of claim 11, wherein the ontology is instantiated as a database stored on a storage medium and the identified concept, the identified property, and the identified relationship are instantiated as fields within the database.

15. A computer program product for constructing an ontology, the computer program product comprising a computer readable storage medium having program instructions embodied therewith, the program instructions executable by a computer to cause the computer to:
using a chatbot program to elicit an utterance from a user;
receiving the utterance from the user;
parsing the received utterance to detect a concept therein;
determine whether the identified concept is represented within an ontology and adding the identified concept to the ontology when it is determined that the concept is not present therein;
parsing the received utterance to detect a property therein;
determine whether the identified property is represented within the ontology and adding the property to the ontology when it is determined that the property is not present therein;
parsing the received utterance to detect a relationship therein;
determine whether the identified relationship is represented within the ontology and adding the relationship to the ontology when it is determined that the relationship is not present therein;

generating a response to the received utterance using the ontology; and presenting the generated response to the user using the chatbot program, wherein adding the identified concept to the ontology includes asking the user one or more questions related to the concept, wherein adding the identified property to the ontology includes asking the user one or more questions related to the property, and wherein adding the identified relationship to the ontology includes asking the user one or more questions related to the relationship.

16. The computer program product of claim 15, wherein the chatbot program is instantiated as a text-based communication interface.

17. The computer program product of claim 16, wherein the user interacts with the text-based communication interface via text messages from a mobile phone.

18. The computer program product of claim 15, wherein the chatbot program is instantiated as a smart speaker and/or a voice-based digital assistant.

19. The computer program product of claim 15, wherein the received utterance is received in vocal form or in textual form and digitized.

20. The computer program product of claim 15, wherein the generated response is presented to the user as synthetic speech.

\* \* \* \* \*